US 11,468,489 B2

United States Patent
Xu et al.

(10) Patent No.: US 11,468,489 B2
(45) Date of Patent: Oct. 11, 2022

(54) SYSTEM, NON-TRANSITORY COMPUTER READABLE MEDIUM, AND METHOD FOR SELF-ATTENTION WITH FUNCTIONAL TIME REPRESENTATION LEARNING

(71) Applicant: Walmart Apollo, LLC, Bentonville, AR (US)

(72) Inventors: Da Xu, San Jose, CA (US); Chuanwei Ruan, Santa Clara, CA (US); Evren Korpeoglu, San Jose, CA (US); Sushant Kumar, Sunnyvale, CA (US); Kannan Achan, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 84 days.

(21) Appl. No.: 16/669,663

(22) Filed: Oct. 31, 2019

(65) Prior Publication Data
US 2021/0133846 A1 May 6, 2021

(51) Int. Cl.
*G06Q 30/06* (2012.01)

(52) U.S. Cl.
CPC ..... *G06Q 30/0631* (2013.01); *G06Q 30/0633* (2013.01); *G06Q 30/0641* (2013.01)

(58) Field of Classification Search
CPC .............. G06Q 30/08; G06Q 30/0601; G06Q 30/0631; G06Q 30/0633; G06Q 30/0641; G06N 5/02
USPC ................................................ 705/26.1–27.2
See application file for complete search history.

(56) References Cited

U.S. PATENT DOCUMENTS

| 7,921,042 B2 | 4/2011 | Jacobi et al. |
| 8,090,621 B1 | 1/2012 | Chakrabarti et al. |
| 8,095,521 B2 | 1/2012 | Chan et al. |
| 8,880,439 B2* | 11/2014 | Archambeau .......... G06N 7/005 706/12 |
| 10,438,131 B1* | 10/2019 | Pennington ............. G06F 17/14 |
| 10,699,321 B2* | 6/2020 | Krishnamurthy .. G06Q 30/0631 |
| 10,824,940 B1* | 11/2020 | Rybakov .................. G06N 3/08 |
| 2010/0049663 A1 | 2/2010 | Kane, Jr. et al. |
| 2011/0257949 A1 | 10/2011 | Vasudevan et al. |
| 2021/0257949 A1 | 10/2011 | Vasudevan et al. |

(Continued)

FOREIGN PATENT DOCUMENTS

WO    WO-2007131185 A2 * 11/2007 ........... G05B 13/048

OTHER PUBLICATIONS

Lomelí, M., et al. "Antithetic and Monte Carlo Kernel Estimators for Partial Rankings." Statistics and Computing, Feb. 21, 2019, link.springer.com/article/10.1007/S11222-019-09859-z?error=cookies_not_supported&code=883a2c43-b19e-487e-a844-3e77e1a9bcb3.*

(Continued)

*Primary Examiner* — Allison G Wood
(74) *Attorney, Agent, or Firm* — Duane Morris LLP; Manita Rawat (57) ABSTRACT

System and method for generating a ranked list are disclosed. A plurality of prior interactions for a first customer are received by a computing device. Each of the prior interactions includes a product interaction and time. A ranked list of item recommendations is generated based on the plurality of prior interactions. The ranked list of item recommendations is generated by a trained prediction model trained using temporal information embedded into a finite-dimensional vector space. The ranked list of item recommendations is output by the computing device.

14 Claims, 9 Drawing Sheets

(56) References Cited

U.S. PATENT DOCUMENTS

| | | | |
|---|---|---|---|
| 2014/0188865 A1* | 7/2014 | Karatzoglou | G06Q 30/0282 |
| | | | 707/732 |
| 2018/0075137 A1* | 3/2018 | Lifar | G06F 17/16 |
| 2018/0204113 A1* | 7/2018 | Galron | G06Q 30/0631 |
| 2018/0349158 A1* | 12/2018 | Swersky | G06F 9/45516 |
| 2019/0251446 A1* | 8/2019 | Fang | G06N 3/084 |
| 2021/0042619 A1 | 2/2021 | Dasgupta et al. | |

OTHER PUBLICATIONS

Milton, Philip, et al. "Spatial Analysis Made Easy with Linear Regression and Kernels."ArXiv.Org, arXiv, Feb. 22, 2019, arxiv.org/pdf/1902.08679.pdf.*

Huang, Li, Yi-feng Yang, and Lei Wang. Recommender engine for continuous-time quantum Monte Carlo methods. Published Mar. 29, 2017. (Year: 2017).*

Bahdanau et al., "Neural machine translation by jointly learning to align and translate", arXiv preprint arXiv:1409.0473, 2014.

Bengio et al., "Representation learning: A review and new perspectives", IEEE transactions on pattern analysis and machine intelligence, 35(8):1798-1828, 2013.

Chen, et al., "Spatial and channel-wise attention in convolutional networks for image captioning", In Proceedings of the IEEE conference on computer vision and pattern recognition, pp. 5659-5667, 2017.

Chorowski et al., "Attention-based models for speech recognition", In Advances in neural information processing systems, pp. 571-585, 2015.

Dinh et al., "Density estimation using real nvp", arXiv preprint arXiv:1605.08803, 2016.

Du et al., "Recurrent marked temporal point processes: Embedding event history to vector", In Proceedings of the 22nd ACM SIGKDD International Conference on Knowledge Discovery and Data Mining, pp. 1555-1564. ACM, 2016.

Harper et al., "The movielens datasets: History and context", ACM Trans. Interact. Intell. Syst, 5(4):19:1-19:19, Dec. 2015. ISSN 2160-6455. doi: 10.1145/2827872. URL http://doi.acm.org/10.1145/2827872.

Hidasi et al., "Session-based recommendations with recurrent neural networks", arXiv preprint arXiv:1511.06939, 2015.

Jackson, "The theory of approximation", vol. 11. American Mathematical Soc., 1931, p. 501-505.

Kang et al., "Self-attentive sequential recommendation", In 2018 IEEE International Conference on Data Mining (ICDM), pp. 197-206. IEEE, 2018.

Kingma et al., "Auto-encoding variational bayes", arXiv preprint arXiv:1312.6114, 2013.

Li et al., "Time-dependent representation for neural event sequence prediction", arXiv preprint arXiv: 1708.00065, 2017.

Loomis, "Introduction to abstract harmonic analysis", Courier Corporation, 2013.

Mei et al., "The neural hawkes process: A neurally self-modulating multivariate point process", In Advances in Neural Information Processing Systems, pp. 6754-6764, 2017.

Mercer, "Xvi. functions of positive and negative type, and their connection the theory of integral equations", Philosophical transactions of the royal society of London. Series A, containing papers of a mathematical or physical character, 209(441-458):415-446, 1909.

Papamakrias et al., "Masked autoregressive flow for density estimation", In Advances in Neural Information Processing Systems, pp. 2338-2347, 2017.

Rahimi et al., "Random features for large-scale kernel machines", In Advances in neural information processing systems, pp. 1177-1184, 2008.

Rezende et al., "Variational inference with normalizing flows", arXiv preprint arXiv:1505.05770, 2015.

Tang et al., "Personalized top-n sequential recommendation via convolutional sequence embedding", In Proceedings of the Eleventh ACM International Conference on Web Search and Data Mining, pp. 565-573. ACM, 2018.

Vaswani et al., "Attention is all you need", In Advances in neural information processing systems, pp. 5998-6008, 2017.

Widom, "Asymptotic behavior of the eigenvalues of certain integral equations, ii.", Archive for Rational Mechanics and Analysis, 17(3):278-295, 1964.

Xiao et al., "Joint modeling of event sequence and time series with attentional twin recurrent neural networks", arXiv preprint arXiv:1703.08524, 2017.

Xiao et al., "Modeling the intensity function of point process via recurrent neural networks", In Thirty-First AAAI Conference on Artificial Intelligence, 2017.

Xu et al., "Context-aware dual representation learning for complementary products recommendation", arXiv preprint arXiv:1904.12574v2, 2019.

Xu et al., "Show, attend and tell: Neural image caption generation with visual attention", arXiv preprint arXiv:1502.03044, 2015.

Zhao et al., "Seismic: A self-exciting point process model for predicting tweet popularity", In Proceedings of the 21th ACM SIGKDD International Conference on Knowledge Discovery and Data Mining, pp. 1513-1522. ACM, 2015.

Zhu et al., "What to do next: Modeling user behaviors by time-lstm", In IJCAI, pp. 3602-3608, 2017.

Da Xu et al., "A Temporal Kernel Approach for Deep Learn-Ing With Continuous-Time Information," Published as a conference paper at ICLR 2021, Mar. 28, 2021, pp. 1-33.

Tavenard, et al., "Efficient Temporal Kernels between Feature Sets for Time Series Classification", Efficient Temporal Kernels between Feature Sets for Time Series Classification. European Conference on Machine Learning and Principles and Practice of Knowledge Discovery, Sep. 2017, Skopje, Macedonia.

Phillips, et al., "Spectral Density Estimation and Robust Hypothesis Testing Using Steep Origin Kernels without Truncation", International Economic Review vol. 47, No. 3, 2005, pp. 837-894.

Kim, et al., "Non-Parametric Spectral Density Estimation Under Long-Range Dependence", J. Time Ser. Anal., 2018, 22 pages.

Lopez-Ramos, et al., "Explainable nonlinear modelling of multiple time series with invertible neural networks", arXiv, Jul. 2021, 12 pages.

* cited by examiner

SYSTEM, NON-TRANSITORY COMPUTER READABLE MEDIUM, AND METHOD FOR SELF-ATTENTION WITH FUNCTIONAL TIME REPRESENTATION LEARNING

TECHNICAL FIELD

This application relates generally to system and methods for generating item recommendations and, more particularly, to generating personalized item recommendations using product interaction and time value data.

BACKGROUND

Users interact with e-commerce interfaces, such as e-commerce websites, to select and purchase items from the inventory of the e-commerce interface. A user may add one or more items to a virtual cart after performing a search. For example, a user may search for "throw pillows" and receive a result set containing throw pillows from the e-commerce inventory. A user may have to review multiple items before finding one or more items that match the user's preferences, such as style, price, color, etc.

In order to facilitate higher rates of user interaction (e.g., click-through, add-to-cart, sale, etc.), some e-commerce interfaces are configured to generate lists of recommended or suggested items. Current collaborative filtering solutions, e.g., classical factorization models or more recent skip-gram models, focus on average or long-term customer interest but fail to account for shifts in customer interest over time. Other solutions, such as sequential modeling solutions, can make predictions based on sequences of items, but require short time cutoffs to account for shifts in customer interest and lose historic user interest data due to the cut-offs.

SUMMARY

In various embodiments, a system for generating item recommendations is disclosed. The system includes a computing device configured to receive a plurality of prior interactions for a first customer. Each of the prior interactions includes a product interaction and a time value. The computing device is further configured to generate a ranked list of item recommendations based on the plurality of prior interactions. The ranked list of item recommendations is generated by a trained prediction model trained using temporal information embedded into a finite-dimensional vector space. The computing device is further configured to output the ranked list of item recommendations.

In various embodiments, a non-transitory computer readable medium having instructions stored thereon is disclosed. The instructions, when executed by a processor cause a device to perform operations including receiving a plurality of prior interactions for a first customer. Each of the prior interactions includes a product interaction and a time value. The device is further configured to generate a ranked list of item recommendations based on the plurality of prior interactions. The ranked list of item recommendations is generated by a trained prediction model trained using temporal information embedded into a finite-dimensional vector space. The device is further configured to output the ranked list of item recommendations.

In various embodiments, a computer-implemented method is disclosed. The method includes a step of receiving a plurality of prior interactions for a first customer. Each of the prior interactions includes a product interaction and a time value. A ranked list of item recommendations is generated based on the plurality of prior interactions. The ranked list of item recommendations is generated by a trained prediction model trained using temporal information embedded into a finite-dimensional vector space. The ranked list of item recommendations is output to one or more additional systems.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise. The term "operatively coupled" is such an attachment, coupling, or connection that allows the pertinent structures to operate as intended by virtue of that relationship. In the claims, means-plus-function clauses, if used, are intended to cover structures described, suggested, or rendered obvious by the written description or drawings for performing the recited function, including not only structure equivalents but also equivalent structures.

Figure 1:
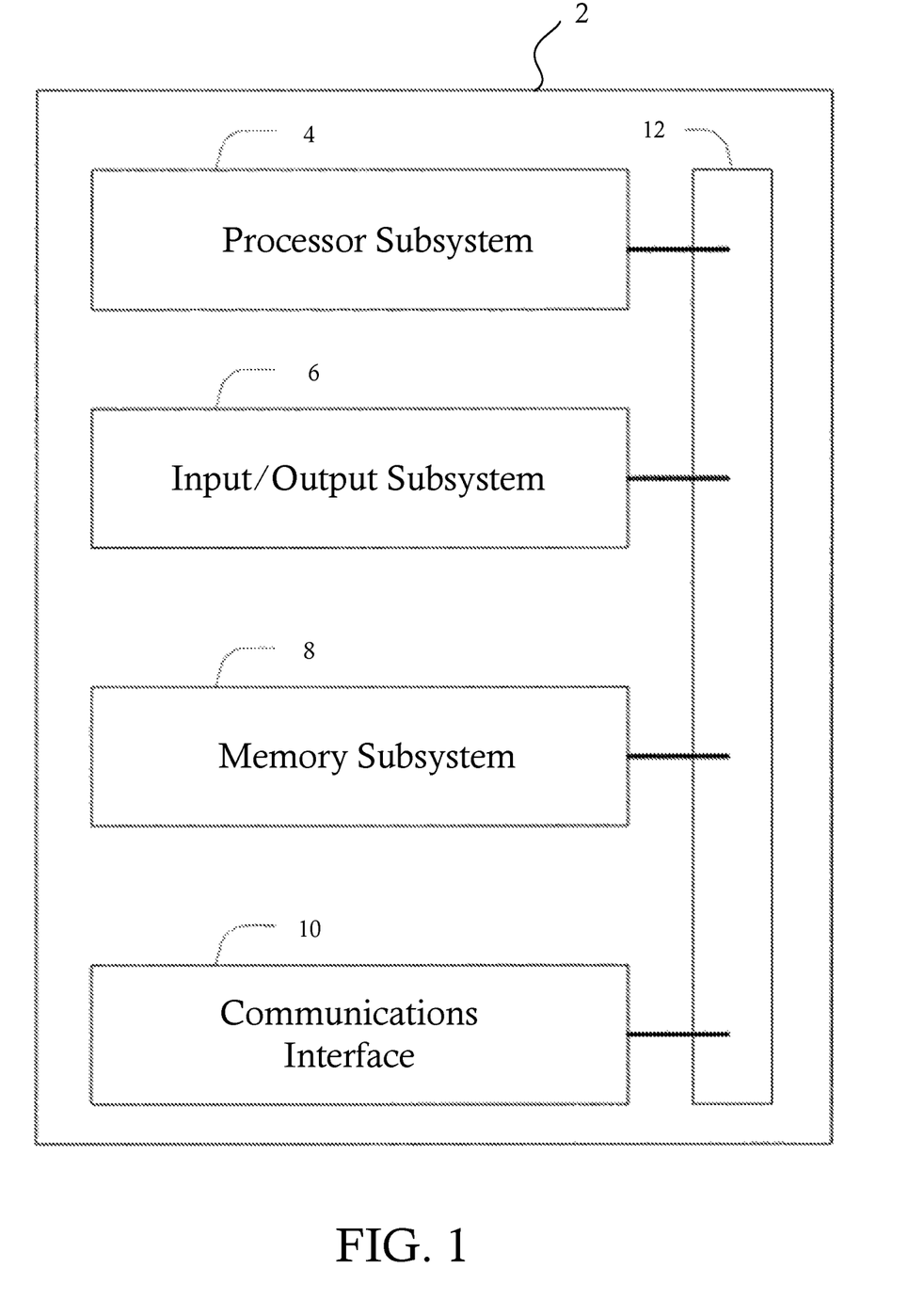
FIG. 1 illustrates a block diagram of a computer system, in accordance with some embodiments.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including an input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including A/B testing and cache optimization, as described herein. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming In some embodiments a compiler or interpreter is comprised to convert the instruction set into machine executable code for execution by the processing subsystem 4.

Figure 2:
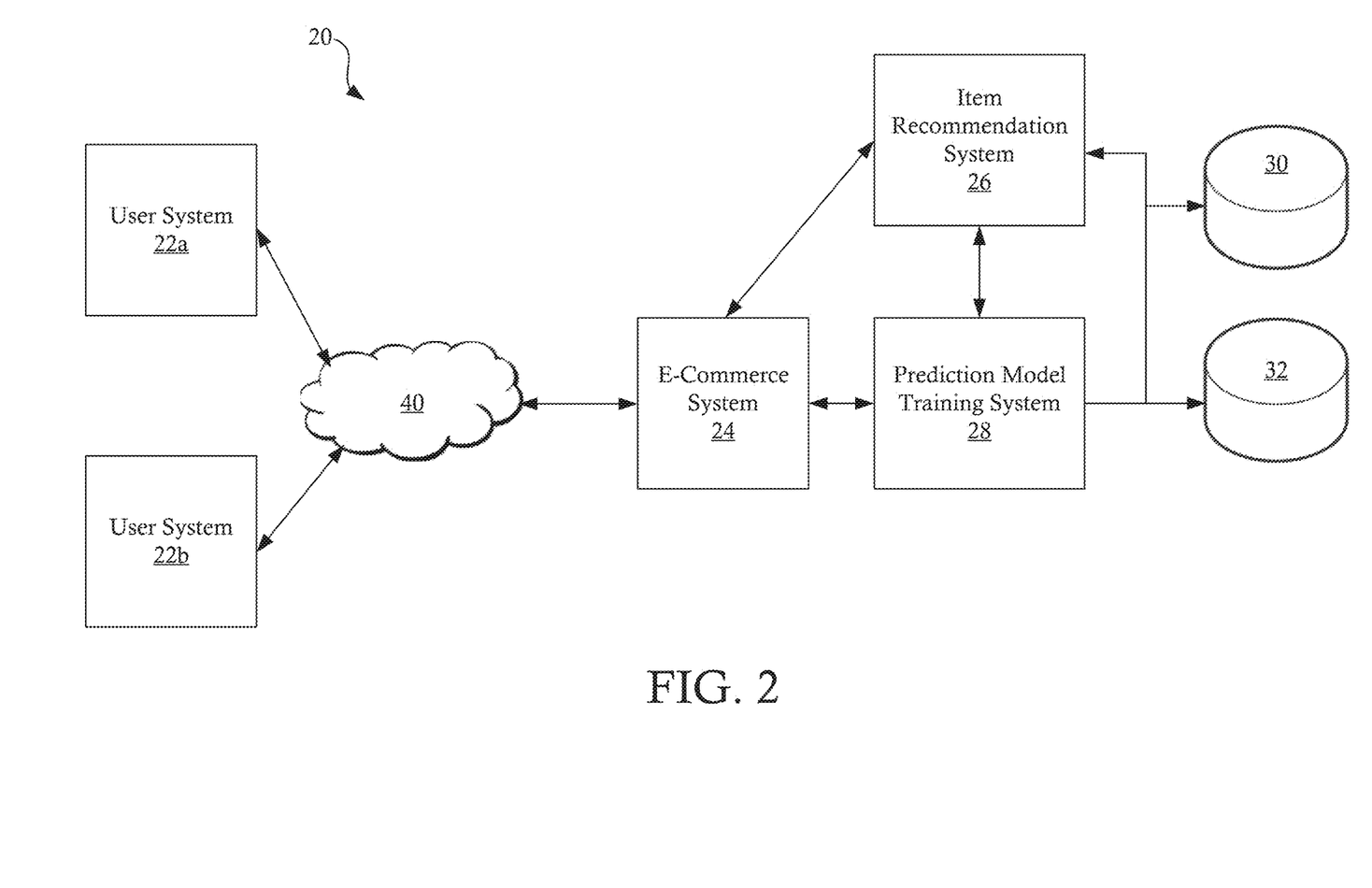
FIG. 2 illustrates a network configured to provide personalized user recommendations based on self-attention and time representation, in accordance with some embodiments.

FIG. 2 illustrates a network environment 20 configured to provide personalized user recommendations based at least partially on temporal values embedded into a finite-dimensional vector space, in accordance with some embodiments. The network 20 includes a plurality of user systems 22a, 22b in signal communication with an e-commerce system 24 via one or more intervening networks, illustrated as network cloud 40. The e-commerce system 24 is in signal communication with an item recommendation system 26 and a prediction model generation system 28. In some embodiments, the e-commerce system 24, the item recommendation system 26 and/or the prediction model generation system 28 are in signal communication with a product database 30 and/or an interaction database 32. Although embodiments are illustrated with various systems and components 24-32 shown as separate elements, it will be appreciated that various systems and components may be combined into a single system and/or be split out into additional systems. For example, in some embodiments, each of the e-commerce system 24, the item recommendation system 26, the prediction model generation system 28, the product database 30, and/or the interaction database 32 may be combined into a single system and/or divided among multiple systems. It will be appreciated that any suitable physical and/or logical combination of systems and components is possible.

In some embodiments, a user system 22a, 22b interacts with an e-commerce interface provided by the e-commerce system 24. The e-commerce interface is configured to present one or more products, product pages, descriptions, etc. to enable a user to view and purchase items. In some embodiments, the e-commerce interface is configured to provide recommended items to a user system 22a, 22b based on prior interactions between the e-commerce system 24 and the user systems 22a, 22b. As discussed in greater detail below, the recommended items may be selected from items stored in the product database and are ranked by a trained prediction model using prior user interactions. In some embodiments, the prior user interactions are stored in the interaction database 32.

In some embodiments, the e-commerce system 24 receives a set, or list, of recommended items for a specific user system 22a, 22b from the item recommendation system 26. The item recommendation system 26 generates the set of recommended items based on a trained prediction model. The trained prediction model includes one or more functional mapping layers and one or more self-attention layers configured to capture and model user interactions including product interactions and time values. The trained prediction model is configured to generate time-aware, personalized item recommendations for each user based on a set of prior user interactions. The set of personalized item recommendations may be generated and provided to the e-commerce system 24 at a predetermined interval, such as, for example, weekly, daily, etc.

In some embodiments, the trained prediction model is generated by the prediction model generation system 28 and provided to the item recommendation system 26 and/or a production environment for deployment to an item recommendation system 26. The trained prediction model may be updated by replacing the current trained prediction model with a new trained prediction model generated by the prediction model generation system 28 at a predetermined interval, such as, for example, bi-monthly, monthly, weekly, etc. As discussed below, each trained prediction model is generated, at least partially, using temporal information embedded into a finite-dimensional vector space and includes a neural network structure having at least one self-attention layer.

Figure 3:
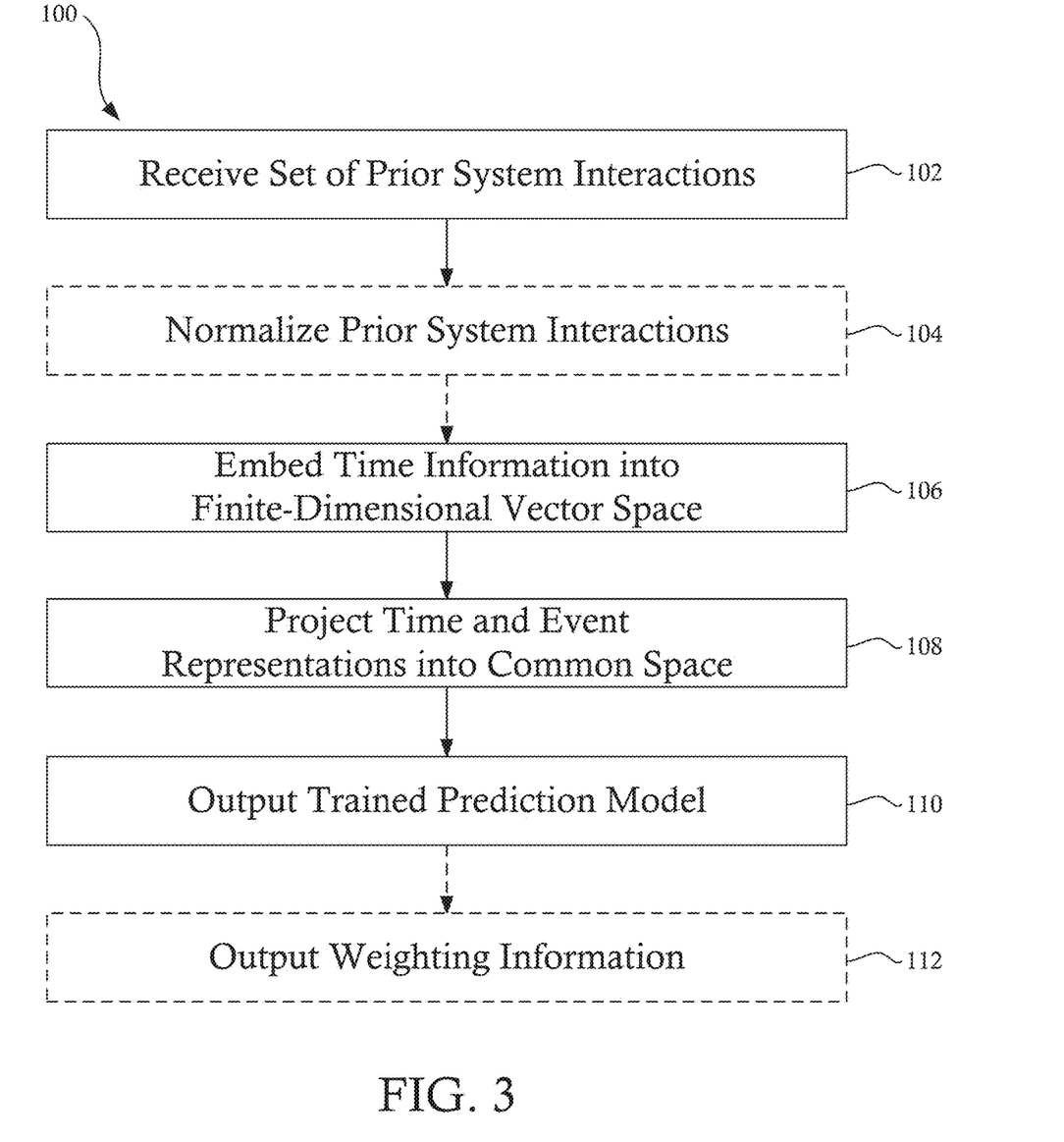
FIG. 3 is a flowchart illustrating a method of generating a trained prediction model using functional mapping and self-attention, in accordance with some embodiments.
Figure 4:
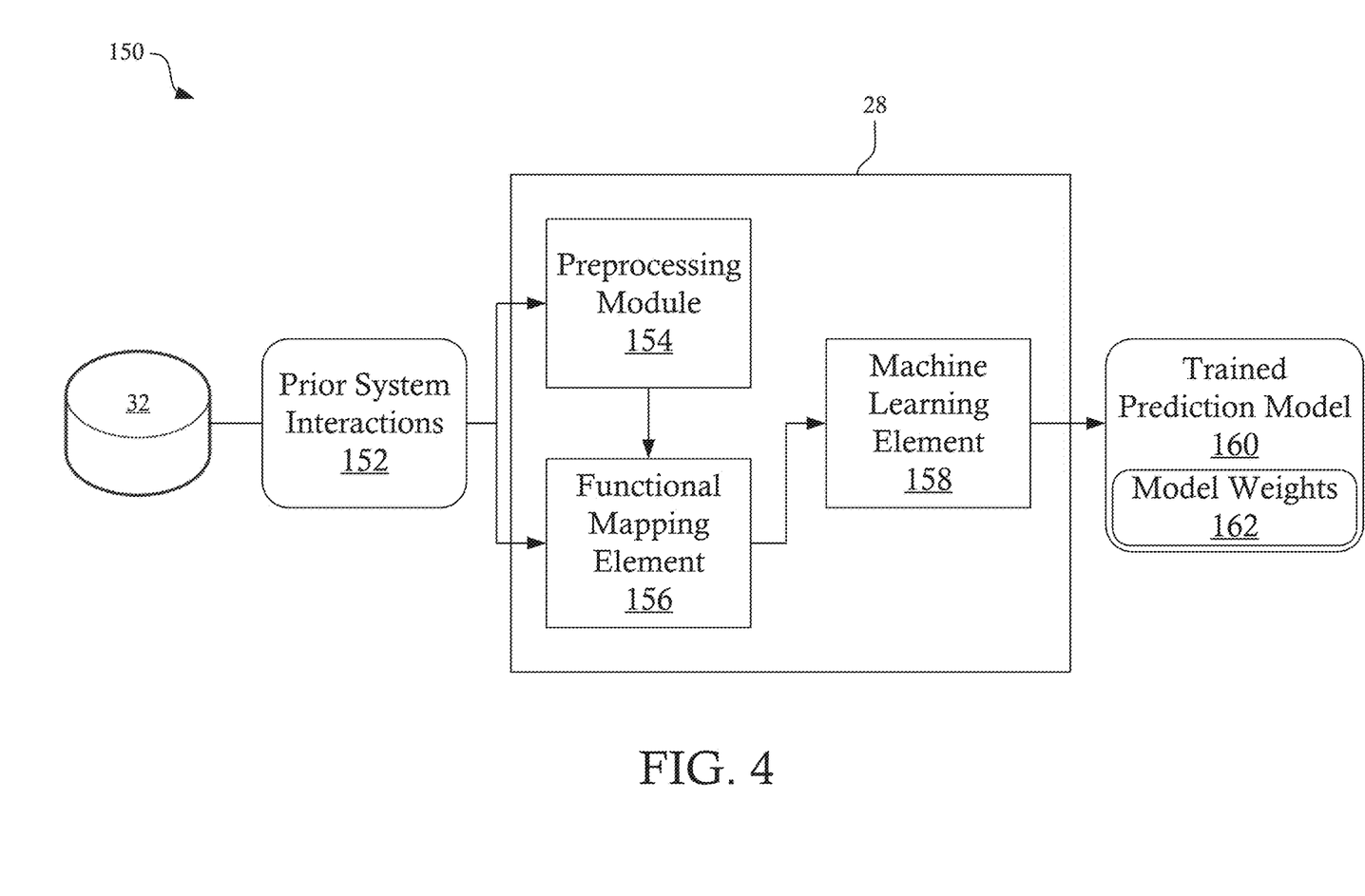
FIG. 4 is a process flow illustrating various steps of the method of generating a trained prediction model illustrated in FIG. 3, in accordance with some embodiments.

FIG. 3 is a flowchart illustrating a method 100 of generating a trained prediction model using functional mapping and self-attention, in accordance with some embodiments. FIG. 4 illustrates a process flow 150 illustrating various steps of the method 100 of generating a trained prediction model illustrated in FIG. 3, in accordance with some embodiments. The method 100 is described with reference to FIGS. 3 & 4. At step 102, a set of prior system interactions 152 is received by a system configured to train a neural network, such as, for example, the prediction model training system 28.

In some embodiments, the set of prior system interactions 152 includes prior user interactions (or impressions) with one or more systems (such as an e-commerce system 24) and corresponding time values. User interactions may include, but are not limited to, user item interactions such as an item view (e.g., user seeing an item in search results, recommended items, ad, etc.), item click-through (e.g., user clicking on link to go to product-specific information), item add-to-cart (e.g., user adding the product to a virtual cart for future purchase), item purchase (user ordering the item), etc. User interactions may also include, but are not limited to, user specified or derived information such as user preferences (color preference, brand preference, etc. of the specific user), aggregated information, anonymized information, and/or any other suitable user interactions. The set of prior system interactions 152 also includes time values for each of the user interactions in the set of prior system interactions 152. The time values may be provided in any suitable format, such as, for example, system time references, absolute time references, time deltas from a set start time, etc.

In some embodiments, the set of prior system interactions 152 may be received from a database configured to maintain prior interaction data, such as, for example, interaction database 32. The set of prior system interactions 152 may be obtained from file system data, such as, for example, log data. The log data may be generated and/or maintained by any suitable system, such as the e-commerce system 24. In some embodiments, log data is maintained for each user.

At optional step 104, the set of prior system interactions 152 may be preprocessed. The preprocessing may be performed by any suitable mechanism, such as, for example, a preprocessing element 154 implemented by the prediction model training system 28, although it will be appreciated that preprocessing may be performed by any suitable system and the set of prior system interactions 152 may be processed prior to being stored in and/or after being retrieved from a storage mechanism, such as the database 32. In some embodiments, preprocessing includes limiting the set of prior system interactions to user sets having at least a predetermined number of interactions or a maximum number of interactions, user sets having at least one interaction within a predetermined time period, interactions within a predetermined category, and/or otherwise limited. For example, in various embodiments, the set or prior interactions 152 may be limited to the last N interactions (where N is any integer greater than 1), limited to users having at least N interactions (e.g., 5, 10, 15, etc.), limited to products having at least N user interactions (e.g., 3, 4, 5, 6 etc.), and/or limited using any other suitable criteria. In some embodiments, the set of prior interactions 152 is split into multiple sets, including, for example, a training set, a validation set, a test set, etc. Preprocessing may further include, but is not limited to, normalization of the item/product interactions and/or time values.

At step 106, the time values in the set of prior system interactions 152 is embedded into a finite-dimensional vector space. In some embodiments, the prediction model training system 28 is configured to utilize functional mapping mechanisms in conjunction with a self-attention mechanism to capture time mapping and product representation (e.g., similar/complimentary item information) in a single neural network architecture. The prediction model training system 28 may augment product embeddings with a time embedding, such as, for example, through addition or concatenation. In some embodiments, time embeddings may be generated using harmonic analysis, such as, for example, by applying a Bochner time embedding method and/or a Mercer time embedding method, as described in greater detail below. In some embodiments, a functional mapping element 156 is configured to implement one or more the functional mapping mechanisms and/or self-attention mechanisms discussed below.

In some embodiments, adding time from an interval (for example, starting at an origin or start time 0) $T=[0; t_{max}]$ to $\mathbb{R}^d$ (which is a vector representative of a discrete position index) is equivalent to finding a mapping $\Phi: T \rightarrow \mathbb{R}^d$. Time embeddings can be added or concatenated to event embedding $Z \in \mathbb{R}^{d_E}$, where $Z_i$ is a vector representation of event $e_i$ (where $i=1, \ldots, V$) for V events. Upon concatenation of the event and time representations, a dot product between two time-dependent events $(e_1; t_1)$ and $(e_2; t_2)$ is:

$$[Z_1, \Phi(t_1)]'[Z_2, \Phi(t_2)] = \langle Z_1, Z_2 \rangle + \langle \Phi(t_1), \Phi(t_2) \rangle \quad \text{Equation 1}$$

where $\langle Z_1, Z_2 \rangle$ represents a relationship between the first event and the second event and $\langle \Phi(t_1), \Phi(t_2) \rangle$ represents the temporal patterns having a temporal difference $t_1-t_2$. In some embodiments, a temporal pattern may be formulated as a translation-invariant kernel K having $\Phi$ as the feature map associated with K.

In some embodiments, the kernel K is represented by the equation:

$$K: T \times T \to \mathbb{R} \quad \text{Equation 2}$$

where $K(t_1, t_2) := \langle \Phi(t_1), \Phi(t_2) \rangle$ and $K(t_1, t_2) = \psi(t_1-t_2)$, $\forall t_1, t_2 \in T$ for some $\psi: [-t_{max}, t_{max}] \to \mathbb{R}$. Assuming that $\Phi$ is continuous, K is translation-invariant, positive semidefinite, and continuous. In some embodiments, $\Phi$ is determined by relating time embedding to kernel function learning using Bochner's Theorem and/or Mercer's Theorem.

In some embodiments, Bochner's theorem is applied to express K as:

$$K(t_1, t_2) = \psi(t_1-t_2) = \int_{\mathbb{R}} e^{i\omega(t_1-t_2)} p(\omega) d\omega = E_\omega[\xi_\omega(t_1)\xi_\omega(t_2)^*] \quad \text{Equation 3}$$

where $\xi_\omega(t) = e^{i\omega t}$, where i represents an imaginary number (e.g., $i^*i = -1$). As the kernel K and the probability measure $p(\omega)$ are real, the real part of Equation 3 can be extracted to provide:

$$K(t_1, t_2) = E_\omega[\cos(\omega(t_1-t_2))] = E_\omega[\cos(\omega t_1)\cos(\omega t_2) + \sin(\omega t_1)\sin(\omega t_2)] \quad \text{Equation 4}$$

In some embodiments, a Monte Carlo integral is implemented using Equation 4 to construct an estimate of kernel $K(t_1, t_2)$:

$$\frac{1}{d}\sum_{i=1}^{d} \cos(\omega_i t_1)\cos(\omega_i t_2) + \sin(\omega_i t_1)\sin(\omega_i t_2) \quad \text{Equation 5}$$

which provides a finite dimensional feature map to $\mathbb{R}^d$ equal to:

$$t \mapsto \Phi_d^B(t) := \sqrt{\frac{1}{d}}[\cos(\omega_1 t), \sin(\omega_1 t), \ldots, \cos(\omega_d t), \sin(\omega_d t)] \quad \text{Equation 6}$$

such that $K(t_1, t_2) \approx \lim_{d \to \infty} \langle \Phi_d^B(t_1), \Phi_d^B(t_2) \rangle$. Samples of the distribution of Equation 6 may be generated using one or more sampling techniques (referred to herein as Bochner time encoding), such as, for example, reparametrization, cumulative distribution function transformations, etc.

In some embodiments, reparametrization may be applied to sample the distribution using an auxiliary variable $\epsilon$ having a known, independent marginal distribution $p(\epsilon)$. For location-scale family distributions such as, for example, Gaussian distributions, $\omega \sim N(\mu, \sigma)$ and the auxiliary random variable $\epsilon \sim N(0,1)$, $\omega$ can be reparametrized as $\mu + \sigma\epsilon$. Samples of $\omega$ are transformed from samples of $\epsilon$ and free distribution parameters $\mu$ and $\sigma$ can be optimized using one or more machine learning techniques. The feature map $\Phi_d^B$ is parameterized by $\mu$ and $\sigma$, which are the inputs to the function $\omega_i(\mu, \sigma)$ that transforms the $i^{th}$ sample from the auxiliary distribution to a sample of a target distribution.

In some embodiments, a cumulative distribution function (CDF) is applied to transform the distribution generated using Bochner's theorem. If $F^{-1}$ is an inverse CDF of a probability distribution then for $\epsilon$ sampled from a uniform distribution, $F^{-1}(\epsilon)$ can be used to generate samples of the distribution. The inverse CDF may be parameterized as $F^{-1} \equiv g_\Theta(.)$. The prediction model generation system 28 and/or any other suitable system may be configured to implement functional approximators such as, for example, neural networks, flow-based CDF estimation methods, normalization flows, etc. to generate samples of the distribution.

In some embodiments, samples of the distribution are generated and fixed during training of a neural network. For example, samples of the distribution are generated, for example, using reparamterization and/or inverse CDF transformation, prior to training and are maintained throughout the training process. For $\{w_i\}_{i=1}^d$ sampled from an auxiliary distribution, $\tilde{\omega}_i = F^{-1}(w_i)$, $i = 1, 2, \ldots, d$, for a non-parametric inverse CDF $F^{-1}$. By fixing the value of the samples, $\omega_i$, $F^{-1}$ may be determined by optimizing transformed samples $\{\tilde{\omega}\}_{i=1}^d$ as free parameters.

| Feature maps specified by $[\phi_{2i}(t), \phi_{2i+1}(t)]$ | Origin | Parameters | Interpretations of $\omega$ |
|---|---|---|---|
| $[\cos(\omega_i(\mu)t), \sin(\omega_i(\mu)t)]$ | Bochner's | $\mu$: location-scale parameters specified for the reparametrization trick. | $\omega_i(\mu)$: converts the $i^{th}$ sample (drawn from auxiliary distribution) to target distribution under location-scale parameter $\mu$. |
| $[\cos(g_\theta(\omega_i)t), \sin(g_\theta(\omega_i)t)]$ | Bochner's | $\theta$: parameters for the inverse CDF $F^{-1} = g_\theta$. | $\omega_i$: the $i^{th}$ sample drawn from the auxiliary distribution. |
| $[\cos(\tilde{\omega}_i t), \sin(\tilde{\omega}_i t)]$ | Bochner's | $\{\tilde{\omega}\}_{i=1}^d$: transformed samples under non-parametric inverse CDF transformation. | $\tilde{\omega}_i$: the $i^{th}$ sample of the underlying distribution $p(\omega)$ in Bochner's Theorem. |

Using a Bochner time encoding, the prediction model generation system 28 can generate an approximation of the kernel function K using samples drawn from the corresponding distribution $p(\omega)$. An upper bound may be applied by the prediction model generation system 28 such that:

$$Pr\left(\sup_{t_1, t_2 \in T} |\Phi_d^B(t_1)'\Phi_d^B(t_2) - K(t_1, t_2)| \geq \epsilon\right) \leq 4\sigma_p \sqrt{\frac{t_{max}}{\epsilon}} \exp\left(\frac{-d\epsilon^2}{32}\right) \quad \text{Equation 7}$$

where $\sigma_p^2$ is the second momentum with respect to $p(\omega)$. Based on equation 7, in some embodiments, the prediction model generation system 28 uses $\Omega$ $$\left(\frac{1}{\epsilon^2}\log\frac{\sigma_p^2 t_{max}}{\epsilon}\right)$$

samples, which provides samples in the order of hundreds when $\epsilon \approx 0.1$, from $p(\omega)$ for any probability of $$\sup_{t_1, t_2 \in T} |\Phi_d^B(t_1)'\Phi_d^B(t_2) - K(t_1, t_2)| \geq \epsilon.$$

In some embodiments, Mercer's Theorem is used to generate time embeddings. Applying Mercer's Theorem, the kernel K is expressed as a continuous, positive semidefinite function that satisfies a condition: $\int_{X \times X} K^2(x, z) d\mathbb{P}(x) d\mathbb{P}(y) \leq \infty$ such that a sequence of eigenfunctions $\phi_{i=1}^\infty$ form an orthonormal basis of $L^2(X, \mathbb{P})$ and an associated set of non-negative eigenvalues $(c_i)_{i=1}^{\infty}$ such that the kernel K is:

$$K(x,z)=\Sigma_{i=1}^{\infty}c_i\phi_i(x)\phi_i(z) \quad \text{Equation 8}$$

where the convergence of the infinite series holds absolutely and uniformly. Mappings from the functional domain T into the infinite sequence space $\ell^2(\mathbb{N})$ are defined as:

$$t \mapsto \Phi^M(t):=[\sqrt{c_1}\phi_1(t),\sqrt{c_2}\phi_2(t)], \quad \text{Equation 9}$$

Mercer's Theorem guarantees the convergence of $\langle \Phi^M(t_1), \Phi^M(t_2)\rangle \to K(t_1, t_2)$.

For a kernel function K that is continuous, positive semidefinite, and translation-invariant with $K=\psi(t_1-t_2)$, the prediction model generation system 28 implements $\psi$ as an even periodic function with $\omega$, i.e., $$\psi(t) = \psi(-t) \text{ and } \psi\left(t + \frac{2k}{\omega}\right) = \psi(t)$$

for all $t \in$ $$t \in \left[-\frac{1}{\omega}, \frac{1}{\omega}\right]$$

and integers $k \in \mathbb{Z}$. The eigenfunctions of K are given by a Fourier basis. The prediction model generation system 28 trains a neural network to detect temporal patterns from a finite set of periodic kernels:

$$K_\omega: T \times T \to \mathbb{R}, \omega \in \{\omega_1, \ldots, \omega_k\} \quad \text{Equation 10}$$

where each $K_\omega$ is a continuous, translation-invariant, and positive semidefinite kernel having a frequency $\omega$. The kernel function K is therefore projected onto a set of periodic kernels having the same properties as K.

For each periodic kernel $K_{\omega i}$, the eigenfunctions stated in Mercer's Theorem are provided by:

$$\phi_{2j}(t) = 1, \phi_{2j}(t) = \cos\left(\frac{j\pi t}{\omega_i}\right), \phi_{2j+1}(t) = \sin\left(\frac{j\pi t}{\omega_i}\right),$$

for $j=1, 2, \ldots, i$ with $c_i$, $i=1, 2, \ldots$ giving the corresponding Fourier coefficients. An infinite dimensional Mercer's feature map for each K is provided by:

$$t \mapsto \Phi_\omega^M(t) = \left[\sqrt{c_1}, \ldots, \sqrt{c_{2j}}\cos\left(\frac{j\pi t}{\omega}\right), \sqrt{c_{2j+1}}\sin\left(\frac{j\pi t}{\omega}\right), \ldots\right] \quad \text{Equation 11}$$

It will be noted that the dependency of all $c_j$ on $\omega$ is omitted for simplicity.

In some embodiments, the Mercer feature map for each $K_\omega$ is truncated to generate a truncated featured map $\Phi_{\omega,d}^M(t)$ such that the complete Mercer's time embedding is given by:

$$t \mapsto \Phi_d^M = [\Phi_{\omega_1,d}^M(t), \ldots, \Phi_{\omega_k,d}^M(t)]^T \quad \text{Equation 12}$$

Thus, the period kernel function is embedded into a high-dimensional space spanned by the truncated Fourier basis for a predetermined frequency. Determining the kernel functions $K_\omega$ is equivalent to learning the Fourier coefficients $c_j$, which are treated as free parameters in some embodiments. The set of frequencies $\{\omega_1, \ldots, \omega_k\}$ is configured to cover abroad range of bandwidths in order to capture various signals and provide a good approximation. The set of frequencies may be fixed and/or jointly optimized as free parameters. The set of frequencies may be initialized using any suitable sequence, for example, a geometric sequence $$\omega_i = \omega_{max} - (\omega_{max} - \omega_{min})^{\frac{i}{k}},$$

$i=1, \ldots, k$, to provide coverage of $[\omega_{min}, \omega_{max}]$ with a focus on higher-frequency regions.

| Feature maps specified by $\lceil \phi_{2i}(t), \phi_{2i+1}(t) \rceil$ | Origin | Parameters | Interpretations of $\omega$ |
|---|---|---|---|
| $[\sqrt{c_{2i,k}}\cos(\omega_j t), \sqrt{c_{2i+1,k}}\sin(\omega_j t)]$ | Mercer's | $\{c_{i,k}\}_{i=1}^{2d}$: the Fourier coefficients of corresponding $K_{\omega j}$, for j = 1, ..., k. | $\omega_j$: the frequency for kernel function $K_{\omega j}$ (can be parameters). |

At step 108, time and event representations (e.g., embeddings) are projected onto a common space and a prediction model, such as trained prediction model 160, is iteratively trained. In some embodiments, a machine learning element 158 implemented by the prediction model training system 28 is configured to implement one or more machine learning techniques, such as, for example, supervised learning techniques (e.g., linear regression, naïve Bayes, decision trees, k-nearest neighbor, neural networks, perceptron networks, etc.), unsupervised learning techniques, and/or any other suitable machine learning techniques. The time embeddings may be generated using any of the methods discussed above in conjunction with step 104 and the event representations may be generated using any suitable embedding generation mechanism.

In some embodiments, for an event sequence $\{(e_1, t_1), (e_2, t_2), \ldots, (e_q, t_q)\}$, the time and event embeddings are concatenated into Z, $Z_T$ where $Z=[Z_1, \ldots, Z_q]$, $Z_T=[\Phi(t_1), \ldots, \psi(t_q)]$. The time and event embeddings may be projected into any suitable space, such as, for example, a query space, a key space, a value space, and/or any other suitable space. In some embodiments, linear combinations of event and time embeddings are generated in query space according to the equation: $Q=[Z, Z_T]W_0+b_0$. As another example, in some embodiments, non-linear relations are projected hierarchically using multilayer perceptrons (MLP) with activation functions, such as:

$$Q=\text{ReLU}([Z,Z_T]W_0+b_0)W_1+b_1 \quad \text{Equation 13}$$

where ReLU(.) is a rectified linear unit. It will be appreciated that any suitable projection may be used to project the time and/or event embeddings. Residual blocks may be added to propagate information to a final output.

In some embodiments, when predicting a next time-dependent event $(e_{q+1}, t_{q+1})$ the prediction model generation system 28 may be configured to take account of a time lag between each event in an input sequence and a target event such that $\hat{t}_i=t_{q+1}-t_i$, $i=1, \ldots, q$ and $\Phi(\hat{t}_i)$ is a time representation. The relative time difference between inputs is $\hat{t}_i-\hat{t}_j=t_i-t_j$ for $i, j=1, \ldots, q$ and the attention weights and prediction are a function of the next occurrence time.

In some embodiments, the disclosed time embedding learning techniques may be combined with additional machine learning and/or computational techniques to train a prediction model. For example, in some embodiments, deep learning techniques, automatic differentiation, and/or other suitable techniques may be combined with the time embedding techniques discussed above. In some embodiments, a prediction model 160 includes a plurality of layers that are trained using the set of prior system interactions 152. The plurality of layers may include one or more feed-forward neural network layers (e.g., perceptron, multi-layer perceptron, etc.), convolution layers, self-attention layers, and/or any other suitable network layers.

At step 110, a trained prediction model 160 is output from the prediction model generation system 28 and provided to one or more other systems, such as, for example, the item recommendation system 26. In some embodiments, the trained prediction model 160 is configured to receive a set of prior user interactions and generate a ranked list of personalized item recommendations for a user. In some embodiments, the trained prediction model 160 is configured to receive a set of candidate items and rank the set of candidate items based on the set of prior user interactions. In some embodiments, the trained prediction model 160 is configured to generate time-aware, personalized item recommendations for each user based on a set of prior user interactions with an e-commerce system.

At optional step 112, in some embodiments, the trained prediction model 160 is configured to provide model weights 162 to one or more other systems for review. The model weights 162 may be used to determine which interactions in the set of prior system interactions 152 contribute most to item recommendations generated by the trained prediction model 160. The model weights 162 may be used to determine why a product recommendation and/or product ranking was generated. For example, in some embodiments, model weights 162 may be reviewed and/or modified to determine when and why a certain set of items contained within a product catalog are recommended.

Figure 5:
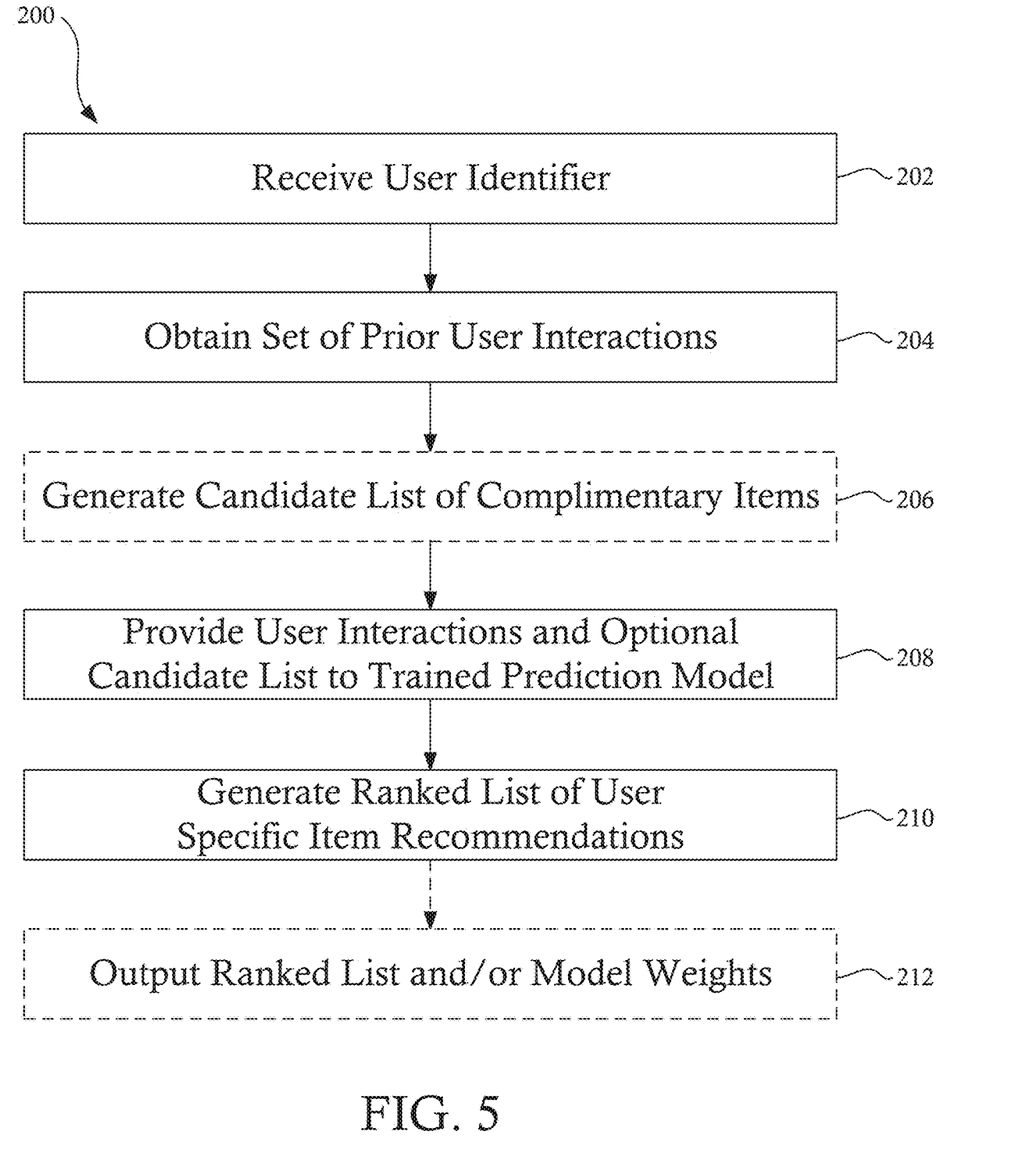
FIG. 5 is a flowchart illustrating a method of generating user-specific predictions in an e-commerce environment, in accordance with some embodiments.
Figure 6:
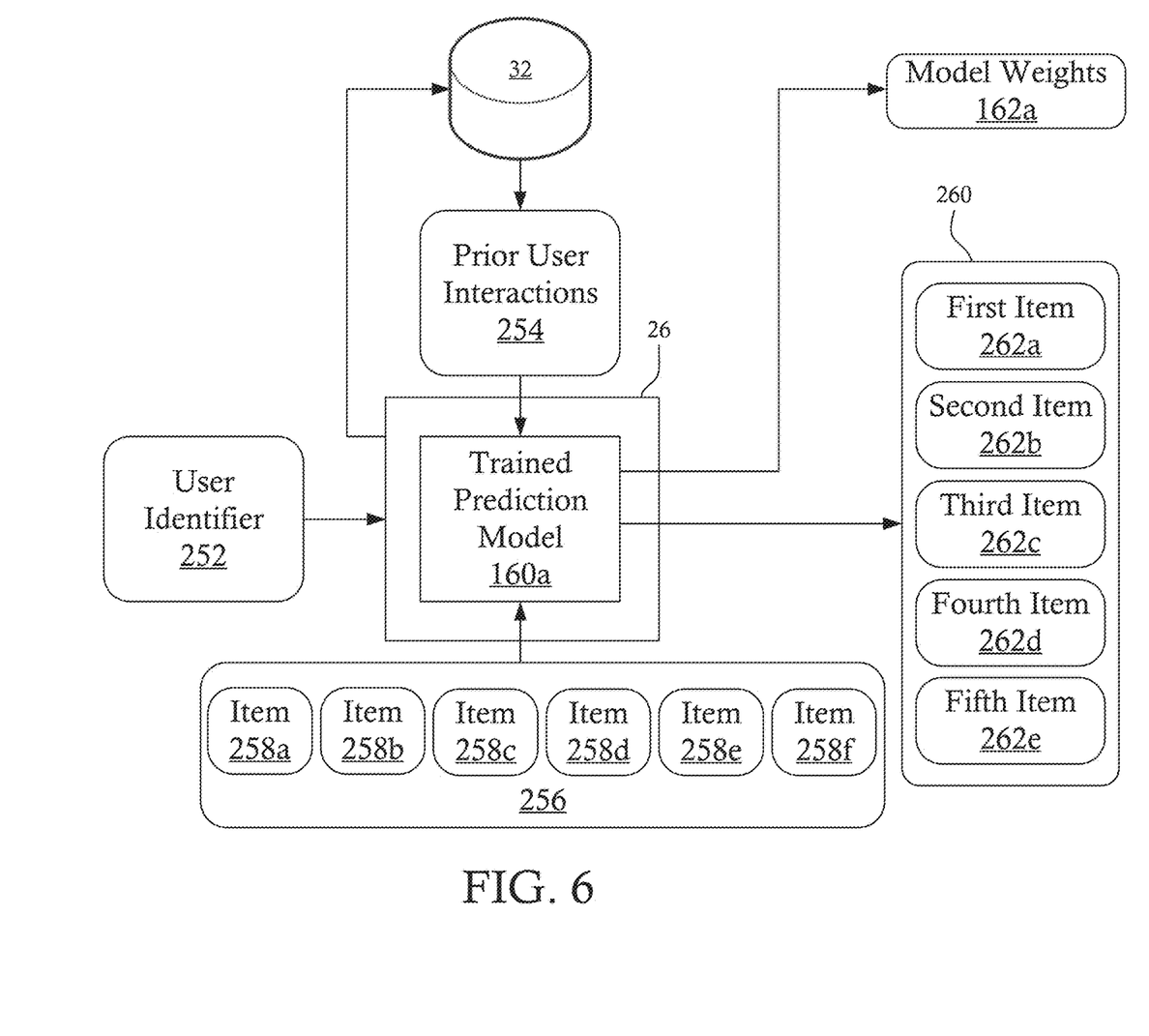
FIG. 6 is a process flow illustrating various steps of the method illustrated in FIG. 5, in accordance with some embodiments.

FIG. 5 is a flowchart illustrating a method 200 of generating user-specific predictions in an e-commerce environment, in accordance with some embodiments. FIG. 6 is a process flow 250 illustrating various steps of the method 200, in accordance with some embodiments. At step 202, a user identifier 252 is received by a suitable system, such as an e-commerce system 24 and/or an item recommendation system 26. The user identifier 252 may be received, for example, from a user system 22a, 22b. The user identifier 252 may include any suitable identifier, such as, for example, a cookie, a beacon, a user log-in, an IP address, and/or any other suitable user identifier. In some embodiments, the user identifier 252 may be received by the e-commerce system 24 and subsequently provided to one or more other systems by the e-commerce system 24, such as, for example, the item recommendation system 26.

At step 204, a set of prior user interactions 254 associated with the user identifier 252 are received by a suitable system, such as the item recommendation system 26. The set of prior user interactions 254 includes a plurality of product interactions and time values for each product interaction for a specific user associated with the user identifier 252. The product interactions may include, but are not limited to, item searches, add-to-cart interactions, product views, product purchases, user specific preferences, and/or any other suitable interaction. The time value associated with each product interaction may include a time stamp or other time indicator that associates the product interaction with a predetermined time period. The temporal information may be system-independent time information (e.g., Greenwich Mean time (GMT)), system-dependent time information (e.g., local time), relative time information (e.g., time since a specific start point or event), and/or stored in any other suitable format. The set of prior user interactions 254 may be maintained by any suitable storage mechanism, such as an interaction database 32. The set of prior user interactions 254 may be stored and/or retrieved in any suitable form, such as, for example, log files maintained by one or more systems within network 20, such as, for example, the e-commerce system 24. Although specific embodiments are discussed herein, it will be appreciated that any suitable data structure, format, location, etc. may be used to store prior user interactions.

At optional step 206, the item recommendation system 26 generates and/or receives a set of candidate complimentary items 256. The set of candidate complimentary items 256 may include one or more complimentary items 258a-258f previously identified and/or selected for one or more items (or products) included in the set of prior user interactions 254. For example, in various embodiments, the set of candidate complimentary items 256 may include items 258a-258f that are frequently purchased with, in the same category as, made by the same manufacturer as, and/or otherwise associated with a product in the set of prior user interactions 254. The set of candidate complimentary items 256 may be generated using any suitable method, such as, for example, a trained neural network, clustering, and/or any other suitable mechanism.

At step 208, the set of prior user interactions 254 and the optional set of candidate complimentary items 256 are provided to a trained prediction model 160a. The trained prediction model 160a may be maintained by any suitable system, such as, for example, the item recommendation system 26. The trained prediction model 160a is generated using temporal information embedded into a finite-dimensional vector space, for example, according to the method 100 discussed above in conjunction with FIGS. 3 & 4. The trained prediction model 160a may be retrieved from a production environment and implemented on one or more systems within a computing cluster.

At step 210, the trained prediction model 160a generates time-aware, personalized item recommendations 260. The personalized item recommendations 260 includes a set of ranked items 262a-262e corresponding to user interests based on various user interactions weighted over time. For example, in some embodiments, the trained prediction model 160a includes a neural network structure having at least one self-attention layer configured to weight user interactions given the time at which the interaction occurred. The trained prediction model 160a may be configured to account for long-term user interest (including long-term interests and/or preferences) and short-term interest. In some embodiments, the set of ranked items 262a-262e includes items selected from the optional set of candidate complimentary items 258a-258f. In other embodiments, the set of ranked items 262a-262e are selected and ranked by the trained prediction model 160a independent. The personalized item recommendations 260 may be provided to the e-commerce system 24 for presentation to a corresponding user system 22a, 22b.

At optional step 212, the personalized item recommendations 260 and/or time-aware weighting factors 162a used by the trained prediction model 160a to generate the ranked list are output and, for example, stored in a database. The personalized item recommendations 260 and/or the time-aware weighting factors 162a may be retrieved and reviewed to identify how and why the personalized item recommendations 260 were generated and to provide insight into operation of the trained prediction model 160a.

Figure 7A:
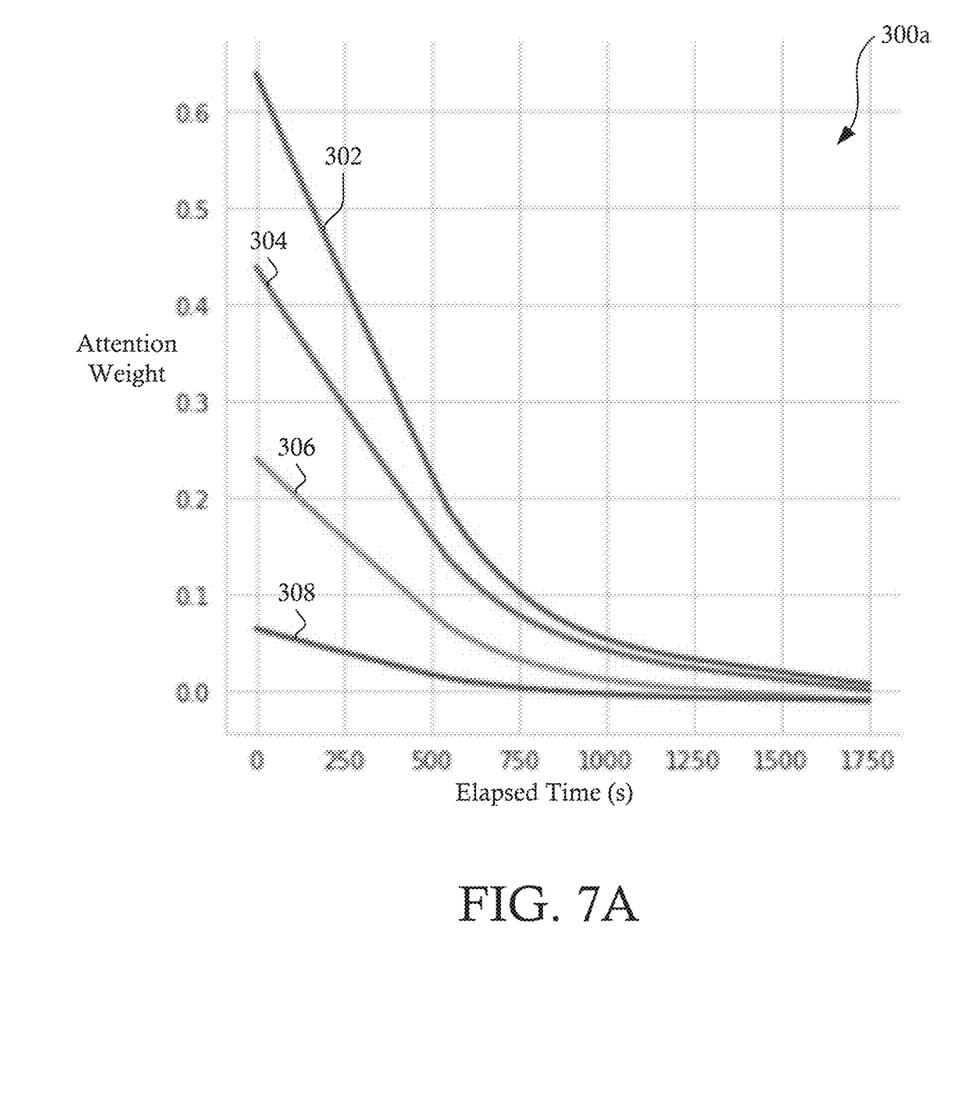
FIGS. 7A-7C are graphs illustrating weighting of various user interactions for one embodiment of a trained prediction model, in accordance with some embodiments.
Figure 7B:
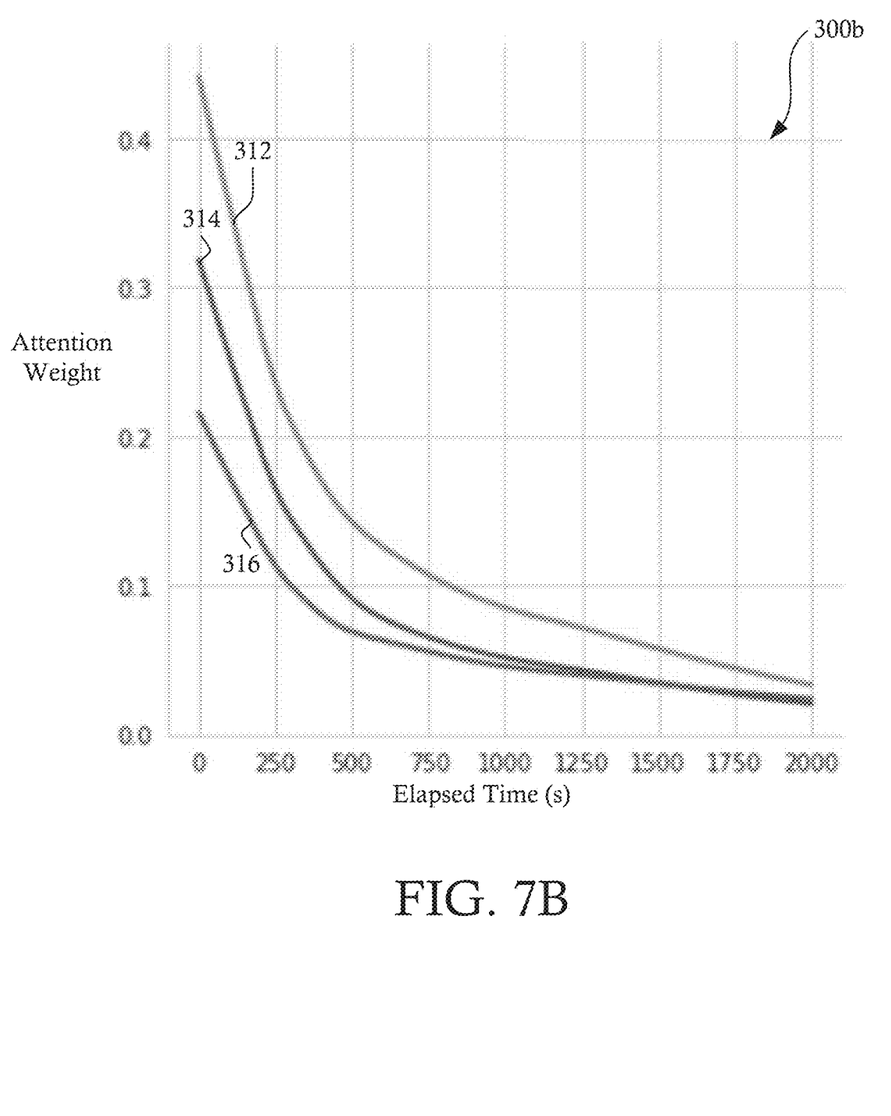
Figure 7C:
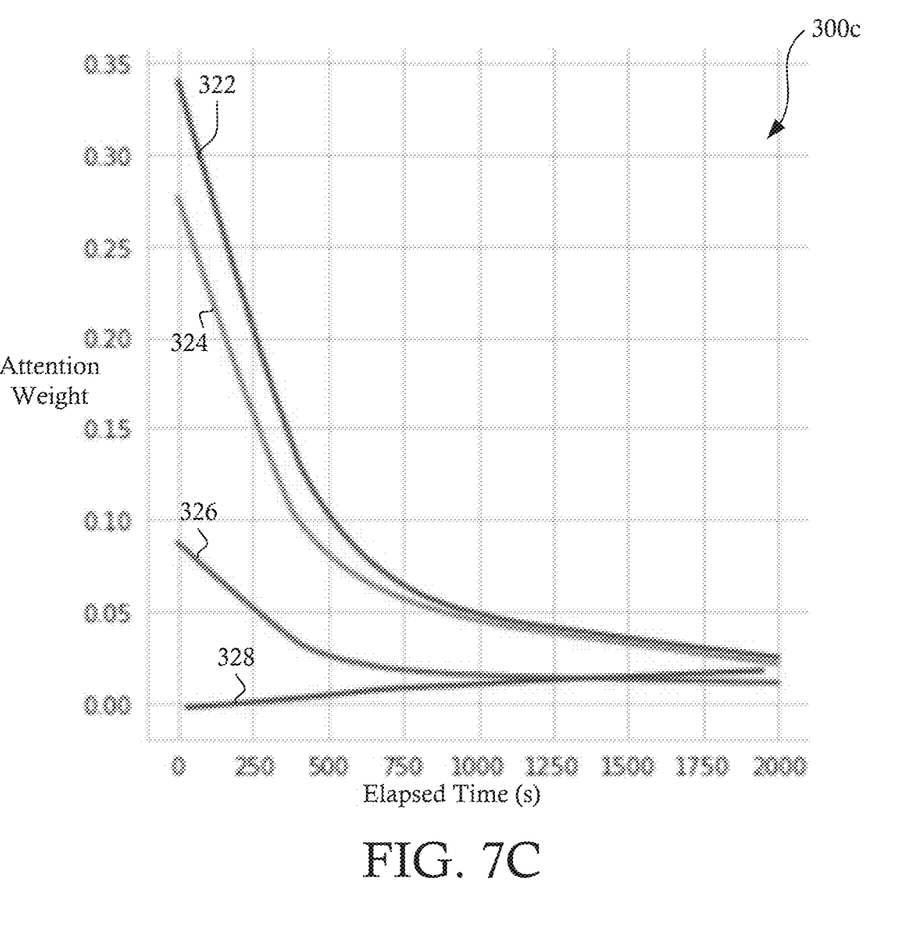

FIGS. 7A-7C are graphs 300a-300c illustrating weighting of various user interactions for one embodiment of a trained prediction model 160, in accordance with some embodiments. The graph 300a of FIG. 7A illustrates temporal patterns 302-308 in average attention weight decay for the last user interaction with the system based on the type of interaction. A first temporal pattern 302 illustrates attention weight decay for an item search, a second temporal pattern 304 illustrates attention weight decay for a viewed item, a third temporal pattern 306 illustrates attention weight decay for an item added to a user's cart, and a fourth temporal pattern 308 illustrates attention weight decay for a purchased item. In some embodiments, items that are searched (first temporal pattern 302) or viewed (second temporal pattern 304) have a greater initial weight than items that are added to a cart (third temporal pattern 306) or purchased (fourth temporal pattern 308), but the weights of each converge over time (with items that are searched or viewed still having a slightly greater weight).

Similarly, the graph 300b of FIG. 7B illustrates temporal patterns 312-316 showing average attention weight decay for items of different departments for various user interactions. A first temporal pattern 312 illustrate attention weight decay for items in a first product category, a second temporal pattern 314 illustrates attention weight decay for items in a second product category, and a third temporal pattern 316 illustrates attention weight decay for items in a third product category. In some embodiments, items in a first category (first temporal pattern 312) have a greater initial weight as compared to items in a second category (second temporal pattern 314) and a third category (third temporal pattern 316), but the weight of each category converges over time (with items in the first category maintaining a slightly higher weight over the second category and third category).

The graph 300c of FIG. 7C illustrates temporal patterns 322-328 showing average attention weight decay for items over time based on specific user interactions. A first temporal pattern 322 illustrates attention weight decay for searched items, a second temporal pattern 334 illustrates attention weight decay for items added to a cart, a third temporal pattern 336 illustrates attention weight decay for viewed items, and a fourth temporal pattern 338 illustrates attention weight decay for purchased item. In some embodiments, items that are searched (first temporal pattern 332) or added to a cart (second temporal pattern 334) have a greater initial weight as compared to items that are viewed (third temporal pattern 336) or purchased (fourth temporal pattern 338), but the weight of each category converges over time (with items being searched or added to a cart maintaining a slightly higher weight over items viewed or purchased).

Although the subject matter has been described in terms of exemplary embodiments, it is not limited thereto. Rather, the appended claims should be construed broadly, to include other variants and embodiments, which may be made by those skilled in the art.

What is claimed is:

1. A system for generating item recommendations, comprising:
 a memory having instructions stored thereon, and a processor configured to read the instructions to:
  receive a plurality of prior interactions associated with a first user identifier, wherein each of the prior interactions includes a product interaction and a time value;
  generate a ranked list of item recommendations based on the plurality of prior interactions, wherein the ranked list of item recommendations is generated by an iteratively trained prediction model trained using temporal information embedded into a finite-dimensional vector space, wherein the trained prediction model comprises one or more functional mapping layers and one or more self-attention layers in a single neural network, wherein the temporal information is embedded into the finite-dimensional vector space using Bochner's theorem, and wherein a Monte Carlo integral is implemented to construct an estimate of a kernel $K(t_1, t_2)$ representative of the temporal information, wherein $$\frac{1}{d}\sum_{i=1}^{d}\cos(\omega_i t_1)\cos(\omega_i t_2) + \sin(\omega_i t_1)\sin(\omega_i t_2)$$

which provides a finite dimensional feature map to $\mathbb{R}^d$ of $$t \mapsto \Phi_d^B(t) := \sqrt{\frac{1}{d}[\cos(\omega_1 t), \sin(\omega_1 t), \ldots, \cos(\omega_d t), \sin(\omega_d t)]};$$

wherein the prior interactions and the representative of the temporal information are projected onto a common space;
  output the ranked list of item recommendations; and
  generate a user interface including the ranked list of item recommendations.

2. The system of claim 1, wherein the temporal information is embedded into the finite-dimensional vector space using Mercer's theorem.

3. The system of claim 2, wherein a kernel representative of the temporal information includes a plurality of periodic kernel functions ($K_\omega$), and wherein a feature map for each $K_\omega$ is truncated to generate a truncated featured map $\Phi_{\omega,d}^M$ (t) such that a time embedding is given by:

$$t \mapsto \Phi_d^M = [\Phi_{\omega_1,d}^M(t), \ldots, \Phi_{\omega_k,d}^M(t)]^T.$$

4. The system of claim 1, wherein the product interaction and the time are projected onto a common space.

5. The system of claim 1, wherein the computing device is configured to output time-aware weighting factors used by the trained prediction model to generate the ranked list of item recommendations.

6. A non-transitory computer readable medium having instructions stored thereon, wherein the instructions, when executed by a processor cause a device to perform operations comprising:
 receiving a plurality of prior interactions associated with a first user identifier, wherein each of the prior interactions includes a product interaction and a time value;
 generating a ranked list of item recommendations based on the plurality of prior interactions, wherein the ranked list of item recommendations is generated by a trained prediction model trained using temporal information embedded into a finite-dimensional vector space, wherein the trained prediction model comprises one or more functional mapping layers and one or more self-attention layers in a single neural network, wherein the temporal information is embedded into the finite-dimensional vector space using Bochner's theorem, and wherein a Monte Carlo integral is implemented to construct an estimate of a kernel $K(t_1, t_2)$ representative of the temporal information, wherein $$\frac{1}{d}\sum_{i=1}^{d}\cos(\omega_i t_1)\cos(\omega_i t_2) + \sin(\omega_i t_1)\sin(\omega_i t_2)$$

which provides a finite dimensional feature map to $\mathbb{R}^d$ of $$t \mapsto \Phi_d^B(t) := \sqrt{\frac{1}{d}[\cos(\omega_1 t), \sin(\omega_1 t), \ldots, \cos(\omega_d t), \sin(\omega_d t)]};$$

wherein the prior interactions and the representative of the temporal information are projected onto a common space;
outputting the ranked list of item recommendations; and
generating a user interface including the ranked list of item recommendations.

7. The non-transitory computer readable medium of claim 6, wherein the temporal information is embedded into the finite-dimensional vector space using Mercer's theorem.

8. The non-transitory computer readable medium of claim 7, wherein a kernel representative of the temporal information includes a plurality of periodic kernel functions ($K_\omega$), and wherein a feature map for each $K_\omega$ is truncated to generate a truncated featured map $\Phi_{\omega,d}^M(t)$ such that a time embedding is given by:

$$t \mapsto \Phi_d^M = [\Phi_{\omega_1,d}^M(t), \ldots, \Phi_{\omega_k,d}^M(t)]^T.$$

9. The non-transitory computer readable medium of claim 6, wherein the product interaction and the time are projected onto a common space.

10. The non-transitory computer readable medium of claim 6, wherein the instructions, when executed by the processor cause the device to perform operations comprising outputting weighting factors used by the trained prediction model to generate the ranked list of item recommendations.

11. A computer-implemented method, comprising:
receiving a plurality of prior interactions associated with a first-user identifier, wherein each of the prior interactions includes a product interaction and a time value;
generating a ranked list of item recommendations based on the plurality of prior interactions, wherein the ranked list of item recommendations is generated by a trained prediction model trained using temporal information embedded into a finite-dimensional vector space, wherein the trained prediction model comprises one or more functional mapping layers and one or more self-attention layers in a single neural network, wherein the temporal information is embedded into the finite-dimensional vector space using Bochner's theorem, and wherein a Monte Carlo integral is implemented to construct an estimate of a kernel $K(t_1, t_2)$ representative of the temporal information, wherein $$\frac{1}{d}\sum_{i=1}^{d}\cos(\omega_i t_1)\cos(\omega_i t_2) + \sin(\omega_i t_1)\sin(\omega_i t_2)$$

which provides a finite dimensional feature map to $\mathbb{R}^d$ of $$t \mapsto \Phi_d^B(t) := \sqrt{\frac{1}{d}[\cos(\omega_1 t), \sin(\omega_1 t), \ldots, \cos(\omega_d t), \sin(\omega_d t)]};$$

wherein the prior interactions and the representative of the temporal information are projected onto a common space;
outputting the ranked list of item recommendations; and
generating a user interface including the ranked list of item recommendations.

12. The computer-implemented method of claim 11, wherein the temporal information is embedded into the finite-dimensional vector space using Mercer's theorem.

13. The computer-implemented method of claim 12, wherein a kernel representative of the temporal information includes a plurality of periodic kernel functions ($K_\omega$), and wherein a feature map for each $K_\omega$ is truncated to generate a truncated featured map $\Phi_{\omega,d}^M(t)$ such that a time embedding is given by:

$$t \mapsto \Phi_d^M = [\Phi_{\omega_1,d}^M(t), \ldots, \Phi_{\omega_k,d}^M(t)]^T.$$

14. The computer-implemented method of claim 11, comprising outputting weighting factors used by the trained prediction model to generate the ranked list of item recommendations.

\* \* \* \* \*